United States Patent [19]

Severinsson

[11] 4,337,690

[45] Jul. 6, 1982

[54] FLUID PRESSURE ACTUATED BRAKE UNIT

[75] Inventor: Lars M. Severinsson, Hishult, Sweden

[73] Assignee: SAB Industri AB, Landskrona, Sweden

[21] Appl. No.: 193,275

[22] PCT Filed: Aug. 22, 1979

[86] PCT No.: PCT/SE79/00175

§ 371 Date: May 6, 1980

§ 102(e) Date: May 6, 1980

[87] PCT Pub. No.: WO80/00605

PCT Pub. Date: Apr. 3, 1980

[30] Foreign Application Priority Data

Sep. 8, 1978 [SE]  Sweden ............................ 7804953

[51] Int. Cl.³ .............................................. F16J 1/10
[52] U.S. Cl. ...................................... 92/129; 74/110; 188/343
[58] Field of Search ................. 92/129; 74/110, 99 A; 188/106 F; 188/343

[56] References Cited

U.S. PATENT DOCUMENTS

| | | | |
|---|---|---|---|
| 1,771,907 | 7/1930 | Abramson | 92/129 |
| 1,799,229 | 4/1931 | Hanna | 74/110 |
| 1,848,775 | 3/1932 | Girling | 188/343 |
| 3,663,115 | 5/1972 | Vindez et al. | 74/110 |
| 3,831,720 | 8/1974 | Williams | 74/110 |
| 3,995,537 | 12/1976 | Severinsson | 74/110 |

FOREIGN PATENT DOCUMENTS 2513870  9/1975  Fed. Rep. of Germany .
2653320  6/1978  Fed. Rep. of Germany .

*Primary Examiner*—Paul E. Maslousky
*Attorney, Agent, or Firm*—Laurence R. Brown

[57] ABSTRACT

A fluid pressure actuated brake unit has a push rod (3) axially movable in a housing (1) and a piston (2) with a wedge element (7) axially movable substantially perpendicular thereto. A wedge surface (12) on the wedge element is arranged to transmit a force from the piston to the push rod via a working roller (8) on the push rod.

In order to reduce the dimensions of the wedge element (7) and to give a smooth transition from the brake application stroke to the brake operation stroke the wedge surface (12) at its end remote from the piston (2) has an edge (13) intended for coaction with the working roller (8) during the brake application stroke.

2 Claims, 3 Drawing Figures

U.S. Patent    Jul. 6, 1982    4,337,690

FLUID PRESSURE ACTUATED BRAKE UNIT

TECHNICAL FIELD

This invention relates to a fluid pressure actuated brake unit, comprising a housing with a piston axially movable in a cylinder, a push rod axially movable substantially perpendicular to the piston and a wedge element, which is attached to the piston for transmitting a force from the piston to the push rod and further to a vehicle brake and has a wedge surface inclined relative to the axis of the piston and intended for coaction during the brake operation stroke with a working roller on the push rod.

BACKGROUND ART

A brake unit of the kind defined above is shown in German Patent Office Publication No. 25 13 870. In this case the wedge surface of the wedge element has a constant wedge angle not only for the brake operation stroke but also for the brake application stroke. The leverage is in other words constant over the whole working range of the wedge element. The brake application stroke will thus not be faster than the brake operation stroke.

One solution to the problem of attaining a faster brake application stroke is disclosed in German Patent Office Publication No. 26 53 320. In this case there are two wedge surfaces on the wedge element: a first wedge surface with a comparatively great wedge angle for a fast application stroke and a second wedge surface with a comparatively small wedge angle for a slower and more powerful brake operation stroke.

This solution, however, has certain drawbacks, of which one is the comparatively great width required for the wedge element due to the two wedge surfaces and another one is the abrupt transition from one wedge angle to another. This latter disadvantage means that it may happen, for example if a built in slack adjuster does not work quite properly, that the application stroke is consumed, before the transition point is reached.

DISCLOSURE OF INVENTION

A more advantageous solution may according to the invention be attained in that the wedge surface at its end remote from the piston has an edge intended for coaction with the working roller during the brake application stroke. This edge thus corresponds to the wedge surface with the great angle in the device according to DE No. 26 53 320.

In this way the width of the wedge element may be kept at a minimum resulting in a minimum volume of the brake unit, which is essential. Further, the internal play in the unit will be taken up during the very fast initial application movement. There will also be a gradual transition from the low leverage in the beginning of the stroke to the high and constant leverage when the working roller has entered the wedge surface.

Forces acting non-axially on the push rod will occur in this design. They may be taken up in that according to the invention a support part coacting with a reaction plane in the housing along the push rod is arranged coacially with the working roller.

BRIEF DESCRIPTION OF DRAWING

The invention will be described in further detail below, reference being made to the accompanying drawing, in which.

DESCRIPTION OF THE PREFERRED EMBODIMENT

Figure 1:
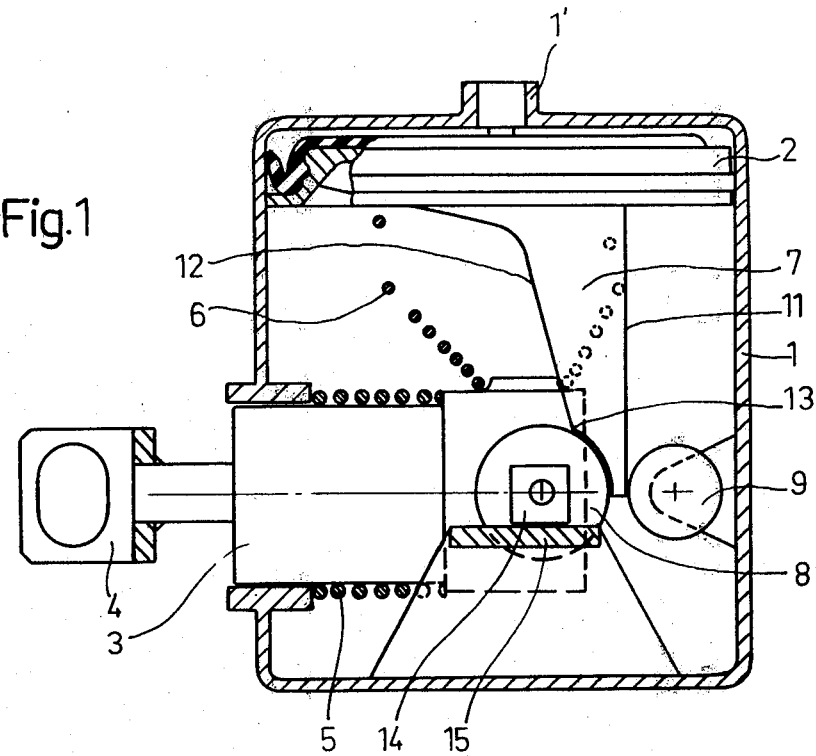
FIG. 1 is a side view, partly in section, of a brake unit with an arrangement according to the invention.

In a housing 1, forming a cylinder at its upper part, a piston 2 is axially movable. The piston 2 is sealed in a conventional way relative to the cylinder. The housing 1 is provided with an inlet 1 for fluid under pressure, preferably compressed air.

A push rod 3 is axially movable in the housing 1 substantially perpendicular to the piston 2. The push rod 3 preferably contains a suitable slack adjuster of any kind and is provided with a yoke 4 for connection to further parts (not shown) of a vehicle brake rigging.

A push rod return spring 5 is arranged between the housing 1 and the push rod 3, whereas a piston return spring 6 is arranged between the piston 2 and the push rod 3.

A fork-shaped wedge element 7 (of which only one leg is visible in the drawing) is attached to the piston 2. This wedge element is arranged astraddle of the push rod 3, and each leg thereof cooperates with a working roller 8 rotatably attached to the push rod 3 and a reaction roller 9 rotatably attached to the housing 1. Thus, there are two working rollers 8 and two reaction rollers 9, but for the sake of simplicity only the cooperation between one roller of each kind and one leg of the wedge element will be described.

The wedge element 7 has a reaction surface 11 parallel with the axis of the piston 2 and a wedge surface 12 inclined relative thereto.

At its end remote from the piston 2 the wedge surface 12 has an edge 13, which in the shown case is the separation line between the wedge surface 12 and a substantially cylindrical surface with about the same radius as the working roller 8.

In a rest position of the different parts of the brake unit as shown in FIG. 1 the edge 13 and said cylindrical surface will be close to but preferably not in contact with the working roller 8.

Figure 2:
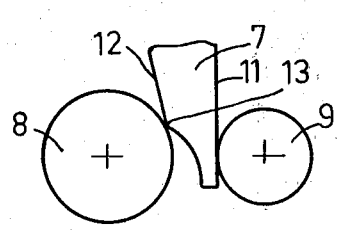
FIGS. 2 and 3 illustrate the coaction between three parts in this brake unit in two working positions.
Figure 3:
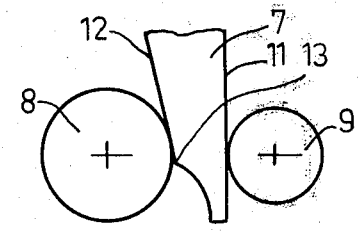

At the admission of fluid under pressure through the inlet 1' the piston 2 will move downwards in FIG. 1. The edge 13 will very soon reach the working roller 8. As the reaction surface 11 bears against the reaction roller 9, the downwards movement of the piston 2 with its wedge element 7 will have to effect that the working roller 8 and thus the push rod 3 is moved to the left in the drawing and that after a certain movement the situation according to FIG. 2 will be attained. After a certain continued movement downwards of the piston 2 and the wedge element 7 the working roller 8 will enter the wedge surface 12 as illustrated in FIG. 3, in which case there is no longer any contact with the edge 13.

With a properly functioning slack adjuster built into the push rod 3 the first part of the piston stroke with the edge 13 in contact with the working roller 8 will correspond to the brake application stroke with a length thus corresponding to the slack between a braking part (a brake shoe or pad) and a braked part (a wheel or disc), whereas the braking stroke or brake operation stroke will commence when the working roller 8 enters the wedge surface 12.

The leverage during the brake operation stroke, when the working roller 8 cooperates with the wedge surface 12, is constant and depends solely on the angle of the wedge surface 12. The wedge angle is chosen so as to give a proper brake force, and the leverage is high, i.e. a long piston movement gives a comparatively short push rod movement.

A fast application stroke is however desirable and is attained by means of the edge according to the invention. The leverage in the very beginning is low giving a fast application stroke. The leverage gradually increases, decelerating the push rod movement, and smoothly passes over in the constant leverage for the brake operation stroke.

A certain guiding for the push rod 3 is provided in a practical embodiment, but a special arrangement for taking up the non-axially forces exerted on the push rod 3 is desirable.

In a practical embodiment a solution illustrated as an example is preferred. A support part 14 is arranged on the same axis as the working roller 8. A plane lower surface thereof is arranged to cooperate with a reaction plane 15 in the housing 1. The push rod 3 will thus be guided against this reaction plane via the support part 14.

One such support part 14 may be arranged at each side of the push rod 3 giving a balanced situation, but if only one support part 14 is provided an upper surface thereof may cooperate with a second reaction plane (not shown) over the support part.

In the preferred embodiment as shown and described the wedge element 11 extends downwards past the edge 13, which here is the separation line between the wedge surface 12 and a substantially cylindrical surface. The object of this extension is only to make possible an advantageous position for the reaction roller 9 opposite the working roller 8 and along the axis of the push rod 3. With another arrangement for the taking up of the reaction force from the wedge element 11, for example a reaction plane, the wedge element 11 could very well end at the edge 13, for example with a cut substantially perpendicular to the reaction surface 11 or even the wedge surface 12.

I claim:

1. A fluid pressure actuated brake unit for a braking system operable to effect a full braking stroke with successive fast acting low leverage brake application and slower acting higher leverage brake operation partial braking strokes comprising in combination, a housing defining a cylinder with a piston therein movable axially, means confining a braking system push rod assembly to move axially in a direction perpendicular to the piston, a wedge element movable with said piston for engaging during said slower acting partial stroke said push rod assembly with a wedge surface inclined at a wedge angle relative to the axis of the piston to transmit a force from the piston to move the push rod in a braking stroke direction over the brake operation partial stroke, said wedge surface presenting the wedge angle terminating in an edge departing from the inclination of said wedge surface, a working roller for moving the push rod assembly having a roller circumference positioned to mate with said edge and wedge angle during the full braking stroke thereby to coact the wedge angle with said working roller during the brake operation partial stroke following the brake application partial stroke in a mode such that only the wedge edge contacts the roller during the application stroke for the low leverage fast acting portion of the braking stroke and provides a gradual transition from the low leverage partial stroke to the higher leverage stroke as the wedge angle contacts the roller in the higher leverage brake operation partial stroke, said roller circumference and wedge element being positioned so that braking stroke contact between the roller and wedge element is limited to the edge and wedge surface of the wedge element.

2. A brake system as defined in claim 1 further comprising in combination a support member mounted co-axially with said roller and having a surface extending perpendicular to its axis in the direction of movement of said push rod, and a coacting surface mounted axially along the push rod for receiving the support member in sliding engagement therealong.

* * * * *